(12) United States Patent
Lee et al.

(10) Patent No.: US 11,655,169 B2
(45) Date of Patent: May 23, 2023

(54) METHOD OF TREATING SPENT CAUSTIC AND APPARATUS THEREOF

(71) Applicants: SK Incheon Petrochem Co., Ltd., Incheon (KR); SBE&E Co., Ltd., Incheon (KR)

(72) Inventors: Sung Ho Lee, Incheon (KR); Sang Ho Lee, Incheon (KR); Min Hee Lee, Incheon (KR); Ji Hoon Yoo, Seoul (KR)

(73) Assignees: SK Incheon Petrochem Co., Ltd., Incheon (KR); SBE&E Co., Ltd., Incheon (KR)

( * ) Notice: Subject to any disclaimer, the term of this patent is extended or adjusted under 35 U.S.C. 154(b) by 533 days.

(21) Appl. No.: 15/793,136

(22) Filed: Oct. 25, 2017

(65) Prior Publication Data

US 2018/0111859 A1    Apr. 26, 2018

(30) Foreign Application Priority Data

Oct. 25, 2016    (KR) .................. 10-2016-0138865

(51) Int. Cl.

| | |
|---|---|
| *C02F 1/72* | (2023.01) |
| *B01J 35/00* | (2006.01) |
| *B01J 35/02* | (2006.01) |
| *B01J 37/03* | (2006.01) |
| *B01D 53/78* | (2006.01) |
| *B01J 21/06* | (2006.01) |
| *C02F 9/00* | (2023.01) |

(Continued)

(52) U.S. Cl.
CPC .............. *C02F 1/722* (2013.01); *B01D 53/78* (2013.01); *B01J 21/063* (2013.01); *B01J 35/002* (2013.01); *B01J 35/004* (2013.01); *B01J 35/0013* (2013.01); *B01J 35/023* (2013.01); *B01J 37/036* (2013.01); *C02F 1/725* (2013.01); *C02F 9/00* (2013.01); *B01J 2219/00018* (2013.01); *C02F 1/32* (2013.01); *C02F 1/78* (2013.01); *C02F 2101/101* (2013.01); *C02F 2103/365* (2013.01); *C02F 2305/02* (2013.01); *C02F 2305/023* (2013.01); *C02F 2305/10* (2013.01)

(58) Field of Classification Search
None
See application file for complete search history.

(56) References Cited

U.S. PATENT DOCUMENTS 3,495,254 A * 2/1970 Clemens ............ B01D 21/0018
                                                    210/522
5,108,929 A * 4/1992 Segura .................... B01F 35/82
                                                    422/111

(Continued)

FOREIGN PATENT DOCUMENTS

| CN | 101584982 A | 11/2009 | |
|---|---|---|---|
| CN | 104692569 A | 6/2015 | |
| WO | WO-2015114298 A1 * | 8/2015 | ............. C02F 1/048 |

*Primary Examiner* — Chester T Barry
(74) *Attorney, Agent, or Firm* — The Webb Law Firm

(57) ABSTRACT

Provided are a method of treating spent caustic occurring in a refinery process, a petrochemical process, and an environmental facility, and an apparatus thereof, wherein the spent caustic may be economically treated by a Fenton-like oxidation reaction at room temperature and atmospheric pressure in a reactor in which catalyst structures are stacked as compared to conventional methods of treating spent caustic.

12 Claims, 5 Drawing Sheets

(51) Int. Cl.
    *C02F 1/32*     (2023.01)
    *C02F 1/78*     (2023.01)
    *C02F 101/10*     (2006.01)
    *C02F 103/36*     (2006.01)

(56) References Cited

U.S. PATENT DOCUMENTS

| | | | | |
|---|---|---|---|---|
| 5,790,934 | A * | 8/1998 | Say | B01D 53/885 |
| | | | | 204/157.15 |
| 2006/0141504 | A1* | 6/2006 | Willman | C12Q 1/6886 |
| | | | | 435/6.14 |
| 2010/0133202 | A1* | 6/2010 | Sannino | C02F 1/32 |
| | | | | 210/748.08 |
| 2012/0165184 | A1* | 6/2012 | Lim | B01J 21/06 |
| | | | | 502/183 |
| 2014/0346121 | A1 | 11/2014 | Poeschl et al. | |
| 2015/0068984 | A1* | 3/2015 | Milosevic | C02F 1/722 |
| | | | | 210/178 |

\* cited by examiner (A)          (B)          (C)

METHOD OF TREATING SPENT CAUSTIC AND APPARATUS THEREOF

CROSS-REFERENCE TO RELATED APPLICATION

This application claims priority to Korean Patent Application No. 10-2016-0138865 filed Oct. 25, 2016, the disclosure of which is hereby incorporated in its entirety by reference.

TECHNICAL FIELD

The following disclosure relates to a method of treating spent caustic occurring in a refinery process, a petrochemical process, and an environmental facility, and an apparatus of treating spent caustic.

BACKGROUND

Spent caustic is known as alkaline wastewater with a high pH that mainly occurs during a desulfurization process in a refinery process or in a petrochemical process. The spent caustic contains sulfide, mercaptide, various phenol components, oil components, etc., has high chemical oxygen demand and biological oxygen demand, smells bad, and is very harmful to life. Accordingly, it is required to perform appropriate treatment before the spent caustic that occurs in various processes or facilities is discharged to an environment.

Conventional methods for treating the spent caustic include incineration or wet air oxidation.

In the incineration treatment, harmful components are removed from a treatment facility such as an incinerator and discharged to the atmosphere or water in such a manner that fuel or fuel oil is gas-combusted, and the spent caustic is then treated using combustion heat. In the incineration treatment, white smoke and odor containing a large amount of sulfur oxides, nitric oxides, a large amount of hydrocarbons occur, and sodium that remains in the treatment facility causes fouling, which makes maintenance of the facility difficult and costs a lot.

The wet oxidation treatment is a method in which wastewater containing sulfur compound, etc., is treated with oxygen in the air by an oxidation reaction in a reactor at a high temperature of 200° C. or higher and a high pressure of 20 to 200 $kg_f/cm^2$, wherein organic materials are converted to carbon dioxide, and various sulfur compounds are converted to thiosulfate or sulfate. The wet air oxidation has been verified as a suitable treatment method of spent caustic and thus, has been used for a long time. However, the oxidation is essentially accompanied by an operating environment under high-temperature and high-pressure condition, resulting in very high investment and operating costs.

To solve problems present in the method of treating such existing spent caustic, U.S. Patent Application Publication No. 2014-0346121 discloses research into various treatment methods including a treatment method using ultrasonic waves generated from a sound device, etc.

The present invention also aims to provide a method of treating spent caustic which is low in the cost required for treating the spent caustic, is simple, and does not require high temperature and high pressure conditions in order to solve the problems of the conventional method of treating spent caustic.

RELATED ART DOCUMENT (Patent Document 1) U.S. Patent Application Publication No. 2014-0346121

SUMMARY

An embodiment of the present invention is directed to providing a method of treating spent caustic which is safe and simple, does not require high temperature and high pressure conditions, and has a low cost, and an apparatus thereof.

In one general aspect, a method of treating spent caustic includes: preparing a mixed solution including spent caustic and an oxidizing agent, oxidizing the spent caustic by passing the mixed solution through catalyst structures while irradiating ultraviolet rays, and separating gas and liquid generated in the oxidation step after the oxidation step.

The catalyst structure may include a titanium oxide photocatalyst produced by wet impregnation of titanium dioxide and bottom-ash.

The oxidation step may be performed in a reactor in which a composite structure including the catalyst structures stacked therein and an ultraviolet (UV) lamp are disposed to be penetrated in parallel with a stacked direction of the catalyst structures in the composite structure.

The oxidation step may be performed in the stacked direction of the catalyst structures, and the gas and the liquid generated in the oxidation step may be oxidized through the reactor in a co-current flow and then separated in the separation step.

All steps of the method of treating spent caustic may be performed at a temperature of 40° C. to 70° C. and a pressure of 1 $kgf/cm^2$ to 2 $kgf/cm^2$.

In another general aspect, a facility of treating spent caustic occurring in a refinery process, a petrochemical process, or an environmental facility, includes: a spent caustic supplier 110 supplying spent caustic to a reactor; an oxidizing agent supplier 120 supplying an oxidizing agent to the reactor; the reactor 130 oxidizing a mixed solution in which the spent caustic supplied from the spent caustic supplier 110 to the reactor and the oxidizing agent supplied from the oxidizing agent supplier 120 to the reactor are mixed; a gas and liquid separator 140 separating gas and liquid generated by oxidation treatment of the mixed solution in the reactor 130; and a discharger 150 discharging the spent caustic in which the oxidation treatment is completed.

DETAILED DESCRIPTION OF MAIN ELEMENTS

Figure 1:
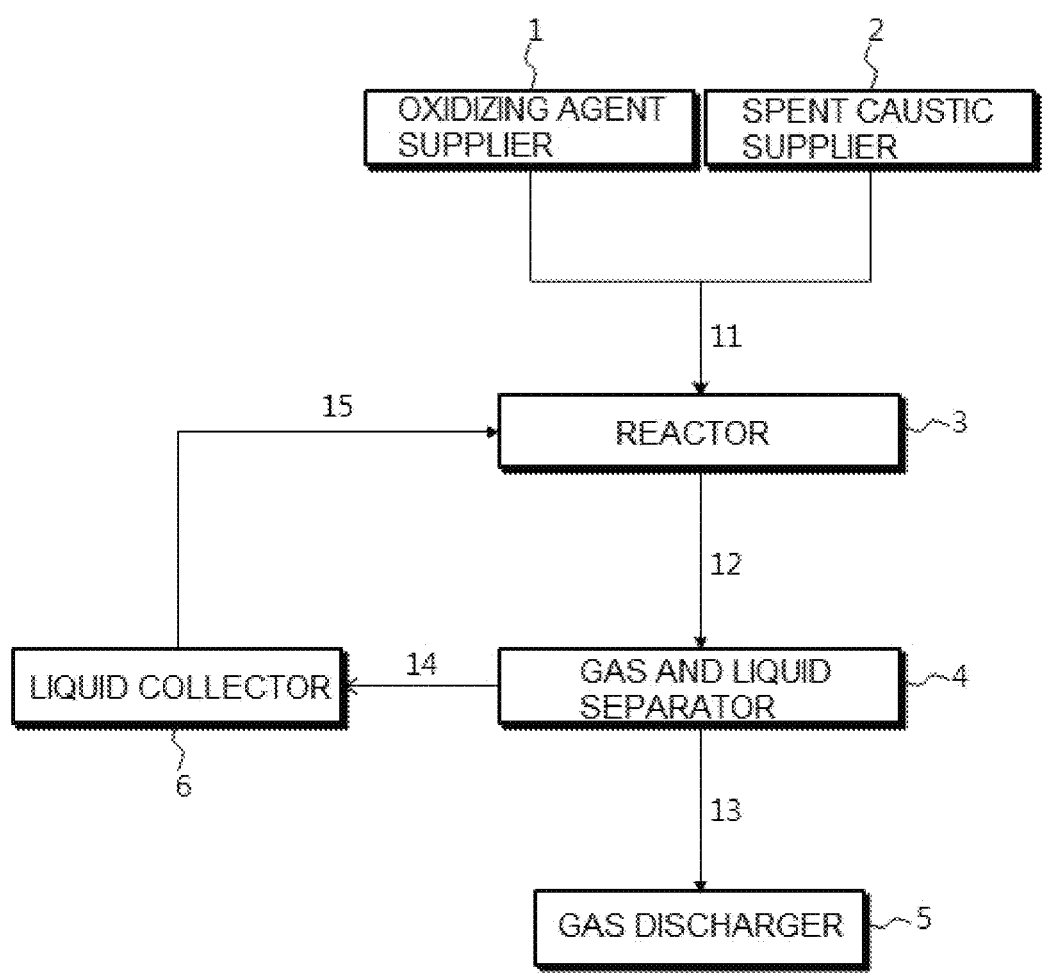
FIG. 1 shows a process chart of a method of treating spent caustic according to the present invention, showing a case where a process is performed two or more times.

1: Oxidizing agent supplier
2: Spent caustic supplier
3: Reactor
4: Gas and liquid separator
5: Gas discharger
6: Liquid collector
20: Catalyst structure combined with support
21: Carrier (support)
22: Catalyst structure
30: Composite structure
31: Catalyst structure
32: Ultraviolet (UV) lamp
100: Facility of treating spent caustic
101: Reactor gas discharger
102: Oxidizing agent liquid level meter
103: Reactor circulation pump suction-side shutoff valve
104: Reactor circulation pump suction side filter
105: Reactor circulation pump
106: Reactor circulation flowmeter
107: Treatment water moving pump
108: Apparatus of measuring contamination (COD) of treatment water
109: Gas and liquid separator liquid level meter
110: Spent caustic supplier
120: Oxidizing agent supplier
130: Reactor
131: First composite structure
132: Second composite structure
133: Third composite structure
134: Fourth composite structure
140: Gas and liquid separator
150: Discharger

DETAILED DESCRIPTION OF EMBODIMENTS

The present invention is described in detail.

In the drawings used for describing the contents of the present invention, portions that may obscure the gist of the present invention may be omitted and may be exaggerated for the sake of understanding of the present invention. The terms used to describe the present invention should be construed in a sense that is commonly understood in the field to which the present invention belongs, unless otherwise defined.

The present invention provides a method of treating spent caustic including: preparing a mixed solution including spent caustic and an oxidizing agent, oxidizing the spent caustic by passing the mixed solution through catalyst structures while irradiating ultraviolet rays, and separating gas and liquid generated in the oxidation step after the oxidation step.

The spent caustic is one of alkaline wastewater that occurs in a process of removing sulfur in a refinery process, a petrochemical process, and an environmental treatment facility, and mainly includes sulfide and mercaptide. The spent caustic has high chemical oxygen demand (COD) and biochemical oxygen demand (BOD), and it is harmful to living organisms when released into the environment and thus, it is discharged to the atmosphere or water through a treatment process. As examples of production of the spent caustic, in the refining process, hydrogen sulfide ($H_2S$) may react with sodium hydroxide (NaOH) to form sodium sulfate ($Na_2S$), and sodium sulfate may react again with hydrogen sulfide to form sodium hydrogen sulfate (NaHS), thereby producing the spent caustic including the NaHS, or thiol (RSH) may react with sodium hydroxide to form mercaptide (RSNa) to produce the spent caustic including the RSNa.

In the present invention, the oxidizing agent mixed with the spent caustic is not limited as long as it is capable of reacting with ultraviolet rays to generate hydroxyl radicals (OH.) and oxygen radicals (O.), and preferably hydrogen peroxide ($H_2O_2$), ozone ($O_3$), and persulfate (potassium persulfate, potassium bisulfate, or the like). The hydroxyl radical may oxidize and decompose a material that is not able to be decomposed with a commonly used oxidizing agent such as $O_2$, $O_3$, $Cl^-$ or $KMnO_4$, and such an oxidation and decomposition method is referred to as an advanced oxidation process (AOP).

In the present invention, the preparation of the mixed solution including spent caustic and an oxidizing agent corresponds to a preparation step for an oxidation treatment, and time at which the oxidizing agent is injected may be appropriately adjusted as needed. For example, the spent caustic may be first injected into a reactor, and the oxidizing agent may be injected into the reactor, thereby preparing the mixed solution including the spent caustic and the oxidizing agent. The spent caustic and the oxidizing agent may be simultaneously injected into the reactor, thereby preparing the mixed solution including the spent caustic and the oxidizing agent. The spent caustic and the oxidizing agent may be mixed in advance to prepare the mixed solution including the spent caustic and the oxidizing agent, and then, the mixed solution may be injected into the reactor. The oxidizing agent may be first injected into the reactor, and the spent caustic may be injected into the reactor, thereby preparing the mixed solution including the oxidizing agent and spent caustic.

In the present invention, the term 'mixed solution' means a solution in which the spent caustic and the oxidizing agent are mixed unless otherwise defined.

According to an exemplary embodiment of the present invention, the catalyst structure may be one which may oxidize the spent caustic by using hydrogen peroxide as the oxidizing agent. For example, the preferred catalyst structure may include titanium oxide.

The treatment method of the present invention may include a step of preparing a mixed solution including spent caustic and an oxidizing agent, and then include a step of oxidizing the spent caustic by passing the mixed solution through catalyst structures while irradiating ultraviolet rays. The oxidizing agent included in the mixed solution reacts with ultraviolet rays while the mixed solution including the spent caustic and the oxidizing agent is passed through the catalyst structure under ultraviolet irradiation to thereby oxidize the spent caustic included in the mixed solution. The oxidation treatment involves oxidation of sulfidic compounds included in the spent caustic into sulfate ions as a main reaction.

According to an exemplary embodiment of the present invention, in the reaction that is generated in the oxidation treatment, hydroxyl radicals are generated from the oxidizing agent by ultraviolet irradiation, and the sulfide and mercaptide included in the spent caustic react with hydroxyl radicals to form sulfur oxides according to an oxidation step such as $S^{2-} \rightarrow S_2O_3^{2-} \rightarrow SO_3^{2-} \rightarrow SO_4^{2-}$.

In the oxidation step of the treatment method of the present invention, the mixed solution including the spent caustic is oxidized to generate gas, and thus, gas and liquid are separated during the oxidation treatment. The liquid produced by oxidation treatment of the mixed solution in the reactor corresponds to oxidized spent caustic, and various gases are generated by the oxidation treatment of the spent caustic. The type of gas includes carbon dioxide, water vapor, oxygen, and trace amounts of $H_2S$ and RSH, and the gas may be then separated and discharged, and the liquid may be collected and used to perform the treatment method again.

The treatment method of the present invention may include a step of separating the gas and the liquid generated in the oxidation step after the oxidation step. The components included in the gas are carbon dioxide, water vapor, oxygen, trace amounts of $H_2S$ and RSH, and the discharged gas is required to be transferred to a separate treatment facility. If the gas remains, pressure may be increased, and thus, efficiency of the treatment method may be reduced or a used apparatus may be damaged. In the case of liquid, since the oxidation treatment of the spent caustic may not be sufficiently performed, the treatment method may be performed again with the liquid collected after the gas is separated. When the treatment method is performed again with the collected liquid, the oxidizing agent may be added to perform the treatment method, and the oxidation step and the separation step may be performed again without adding an additional oxidizing agent.

In the present invention, the liquid separated from the gas and the liquid generated by the oxidation treatment of the mixed solution through the reactor may be removed after performing additional oxidation step and separation step until a $COD_{cr}$ value in chemical oxygen demand (COD) is 20,000 mg/L or less, preferably, 15,000 mg/L or less, and more preferably, 10,000 mg/L or less.

In the method of treating the spent caustic of the present invention, the catalyst structure may include a titanium dioxide photocatalyst produced by wet impregnation of titanium dioxide ($TiO_2$) and bottom-ash. Titanium dioxide is highly active and stable and may generate valence band holes and generate conduction band electrons, thereby generating redox reactions with organic materials or inorganic materials. The titanium dioxide photocatalyst produced by the wet impregnation method is porous and permeable and has excellent adsorption ability by bottom-ash. In particular, since it is not a catalyst structure having a form in which the titanium dioxide is coated on an outer surface, the mixed solution including the spent caustic may react with the titanium dioxide distributed throughout the surface and inside of the titanium oxide photocatalyst while passing through the porous catalyst structure, and thus, an oxidation efficiency is very good.

The titanium oxide photocatalyst may be prepared by supporting a titanium dioxide sol in which nano-sized titanium dioxide particles, a liquid polyvinyl acetate, and cellulose as a binder are mixed on a bottom-ash, followed by drying. The titanium dioxide photocatalyst may be formed into a uniform shape since it is produced by supporting titanium dioxide in a sol state on the bottom-ash.

The titanium oxide photocatalyst has a shape of a polygonal plate having grooves on one side or both sides when viewed from one side, and having a hole at the center so that the ultraviolet lamp may be penetrated when viewed from the front side. The grooves formed on one side or both sides are not limited as long as they have a shape in which a space is formed between the stacked catalyst structures when the catalyst structures are stacked, but it is preferable that a depth is increased from a portion where the groove starts to the center. The shape of the groove is preferably a circular shape, but is not limited thereto. By controlling the shape and the thickness of the titanium oxide photocatalyst and the shape and the depth of the grooves, it is possible to control permeability, permeation time of the mixed solution, a reaction time for the oxidation treatment, and the degree of moisture absorption.

Figure 2:
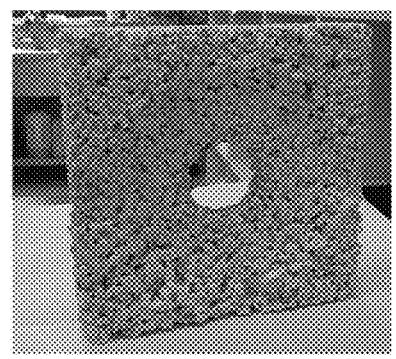
FIG. 2 shows a titanium dioxide photocatalyst.

According to an exemplary embodiment of the present invention, the titanium dioxide photocatalyst may be produced to have a shape as shown in FIG. 2. A through hole through which the ultraviolet lamp may be penetrated may be formed at the center of a square shaped plate as shown in FIG. 3, and when viewed from the side of the titanium oxide photocatalyst, the shape of the groove may be formed to have a circular shape of which a thickness is decreased from the outside to the center.

Figure 3:
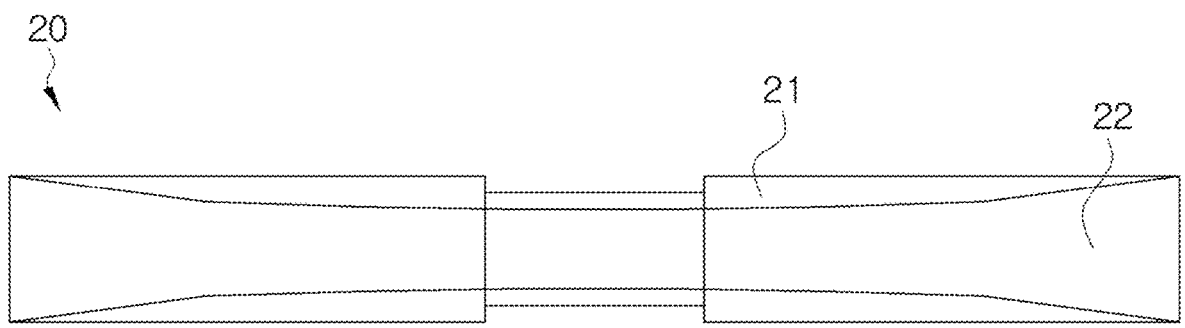
FIG. 3 shows a catalyst structure to which the titanium dioxide photocatalyst and a support are bonded.
Figure 3:
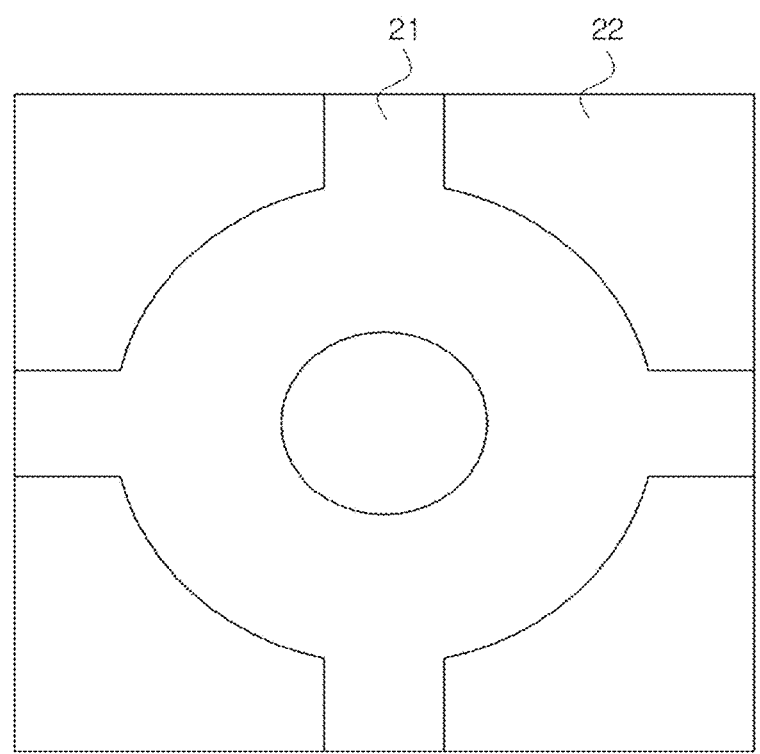

According to another exemplary embodiment of the present invention, the titanium dioxide photocatalyst as shown in FIG. 2 may be produced, and then, a carrier 21 or a supporter which is appropriate for fixing and supporting the titanium dioxide photocatalyst in order to achieve uniform lamination of the titanium dioxide photocatalyst 22 may be provided to produce the catalyst structure 20 as shown in FIG. 3.

When the titanium dioxide photocatalyst is irradiated with ultraviolet rays, titanium dioxide reacts with hydrogen peroxide to generate hydroxyl radicals, and the reaction of oxidizing sulfide and/or mercaptide included in the spent caustic is performed by a Fenton-like oxidation reaction.

The method of treating the spent caustic according to the present invention is performed in a reactor in which a composite structure including the catalyst structures stacked therein and an ultraviolet lamp are disposed to be penetrated in parallel with a stacked direction of the catalyst structures in the composite structure.

In the composite structure, there are certain shapes of gaps (space) depending on the shape of the groove formed in the titanium oxide photocatalyst between the stacked catalyst structures. The gaps formed in the composite structure may reduce differential pressure in the treatment method of the present invention, and may allow to uniformly oxidize the spent caustic occurring when the titanium oxide photocatalyst is permeated. The number of catalyst structures stacked in the composite structure may be adjusted according to the scale of the facility.

In order to more efficiently perform the oxidation treatment of the spent caustic, two or more composite structures are connected in a stacked form, and two or more composite structures are assembled to be a reactor. The oxidation treatment is started while the mixed solution including the spent caustic and the oxidizing agent is injected into and passed through the lowest composite structure in the reactor, and the oxidation treatment reaction in the reactor is finally terminated by passing the mixed solution through the composite structure positioned at the uppermost part in the reactor.

Figure 4:
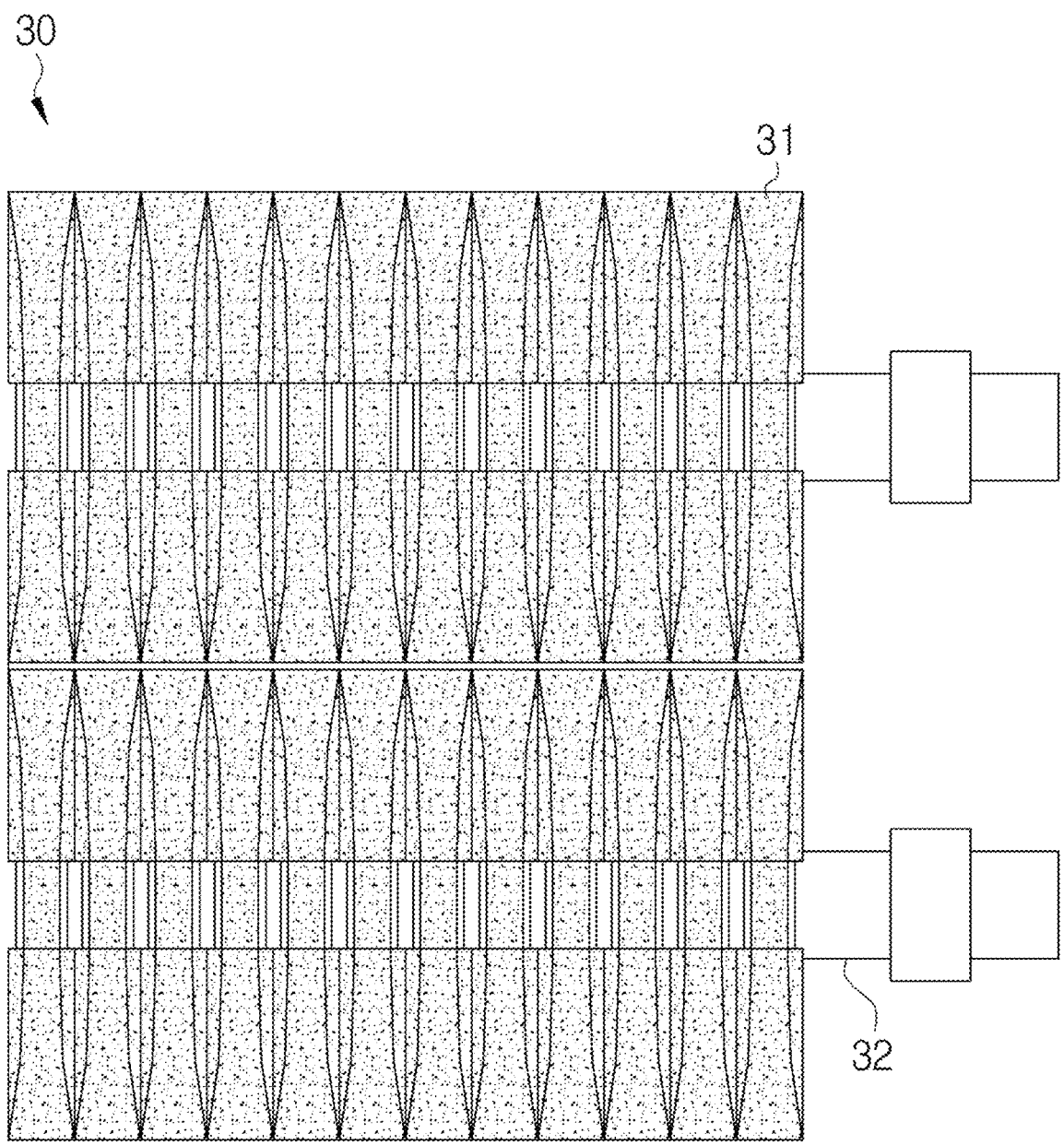
FIG. 4 shows that two composite structures are stacked, the two composite structures including ultraviolet lamps bonded to the stacked catalyst structures.

According to an exemplary embodiment of the present invention, the catalyst structures may be stacked in a square shaped plate to form the composite structure as shown in FIG. 4. FIG. 4 shows a connection in which two or more composite structures are stacked, wherein the composite structures are gathered in this connection form to form a reactor. The composite structure 30 has a hole penetrating the center, wherein an ultraviolet lamp 32 is disposed in a stacked direction of the titanium oxide photocatalysts 31. The ultraviolet lamp may be inserted into a quartz tube so as to protect the ultraviolet lamp and to efficiently irradiate ultraviolet rays, and the quartz tube may be positioned in the hole penetrating the center of the composite structure.

According to an exemplary embodiment of the present invention, the oxidation treatment occurring in the reactor may maintain the differential pressure in the reactor to be low due to the unique structure of the titanium oxide photocatalyst, and may have excellent water permeability, and thus, an oxidation reaction efficiency of the spent caustic included in the mixed solution may be increased, and the reaction time may be decreased.

In the treatment method of the present invention, ultraviolet rays included in a wavelength range corresponding to the known ultraviolet ray region may be irradiated, and the wavelength range is preferably 240 to 260 nm, but is not limited thereto.

In the present invention, the oxidation step is performed in the stacked direction of the catalyst structures, and the gas and the liquid generated in the oxidation step are oxidized through the reactor in a co-current flow and then separated in the separation step.

The mixed solution including the oxidizing agent and the spent caustic moves while passing through the composite structure of the reactor in the stacked direction of the catalyst structures, thereby oxidizing the spent caustic. As the spent caustic is oxidized, gases including carbon dioxide, water vapor, oxygen, trace amounts of hydrogen sulfide and mercaptan, etc., are generated from the mixed solution, and thus, pressure of the reactor may be increased due to the generation of gases. In order to prevent damage and energy consumption of the reactor due to an increase in pressure, the oxidation step is performed so that the gas and the liquid generated in the oxidation step proceed in a co-current flow in the present invention.

The co-current flow refers to a case where fluids flow in the same direction, and a direction or a method of passing the mixed solution through the reactor is not significantly limited as long as the gas and liquid generated in the oxidation step may proceed in a co-current flow. For example, the mixed solution may be injected so that the oxidation reaction may be generated while the mixed solution moves from the lower part to the upper part of the reactor. In this case, the mixed solution may be oxidized while moving in the direction opposite to the gravity, and the gas to be generated may flow in the same direction as the mixed solution and pass through the reactor. The characteristic that the gas and the liquid may flow in the reactor in the co-current flow is resulted from the composite structure including the titanium oxide photocatalysts stacked therein in order to obtain excellent porosity, hygroscopicity, permeability of the titanium oxide photocatalyst and to compensate for relatively low specific surface area of the titanium oxide photocatalyst.

All steps of the method of treating spent caustic in the present invention may be performed at room temperature and atmospheric pressure. Each step of the treatment method may be performed at the corresponding temperature of 10° C. to 100° C., 20° C. to 90° C., 20° C. to 70° C., 20° C. to 80° C., 20° C. to 60° C., 20° C. to 50° C., 20° C. to 40° C., 20° C. to 30° C., 30° C. to 90° C., 30° C. to 80° C., 30° C. to 70° C., 30° C. to 60° C., 30° C. to 50° C., 30° C. to 40° C., 40° C. to 90° C., 40° C. to 80° C., 40° C. to 70° C., 40° C. to 60° C., or 40° C. to 50° C., without changing a temperature. Each step of the treatment method may be performed at a pressure of 1 kgf/cm$^2$ to 10 kgf/cm$^2$, 1 kgf/cm$^2$ to 9 kgf/cm$^2$, 1 kgf/cm$^2$ to 8 kgf/cm$^2$, 1 kgf/cm$^2$ to 7 kgf/cm$^2$, 1 kgf/cm$^2$ to 6 kgf/cm$^2$, 1 kgf/cm$^2$ to 5 kgf/cm$^2$, 1 kgf/cm$^2$ to 4 kgf/cm$^2$, 1 kgf/cm$^2$ to 3 kgf/cm$^2$, 1 kgf/cm$^2$ to 2 kgf/cm$^2$ or 1 kgf/cm$^2$ or less. Since heating or pressurization is not required at a specific step in performing the treatment method, energy consumption may be reduced as compared to the wet air oxidation or the incineration treatment, thereby providing economical efficiency.

In the present invention, the oxidation step and the separation step among the steps of treating the spent caustic may be further performed with the liquid separated in the separation step. The separated solution may include the spent caustic which is not completely treated, and thus, the separated solution may be analyzed and the oxidation step and the separation step may be further performed to further reduce the sulfide included in the separated solution. Further, by further reducing the chemical oxygen demand and the biological oxygen demand, the spent caustic may be discharged and treated to be appropriate for a wastewater treatment plant.

In the method of treating the spent caustic of the present invention, a one-time process is to discharge or obtain the liquid separated through the oxidation step and the separation step after the mixed solution is prepared for the first time. Thereafter, the number of processes is increased by one time for each time the oxidation step and the separation step are further performed with the separated liquid which is not discharged but obtained.

When the process is performed two or more times, additional oxidizing agent is not necessarily mixed, and the oxidizing agent may be further mixed if necessary.

According to an exemplary embodiment of the present invention, in the process performed two or more times, the oxidizing agent and the spent caustic may be supplied from an oxidizing agent supplier 1 and a spent caustic supplier 2, respectively, to prepare the mixed solution, and the mixed solution may be moved to a reactor 3 along a connection pipe 11. The gas and the liquid generated by oxidizing the spent caustic in the reactor 3 are moved to a gas and liquid separator 4 along the connection pipe 12. The gas is separated by the gas and liquid separator and is discharged from a gas discharger 5, and the liquid is collected in a liquid collector 6 and moved to the reactor 3 along the connection pipe 15 again or the oxidized spent caustic is moved from the liquid collector 6 to the spent caustic supplier 2, and then, the steps of treatment method may be further performed thereon. Then, the gas may be separated by the gas and liquid separator without providing the liquid collector 6 separately, and the liquid which is the oxidized spent caustic may be moved to the spent caustic supplier 2, and then, the steps of the treatment method may be further performed thereon.

According to an exemplary embodiment of the present invention, when the process is performed once, the chemical oxygen demand is reduced to about 80%, and the sulfide is reduced to 80% or more, and thus, even when the one-time process is performed, the sulfide and mercaptide of the spent caustic may be treated at a high level.

A facility of treating spent caustic in the present invention is a facility of treating spent caustic occurring in a refinery process, a petrochemical process, or an environmental facility, which includes a spent caustic supplier 110 supplying spent caustic to a reactor; an oxidizing agent supplier 120 supplying an oxidizing agent to the reactor; the reactor 130 oxidizing a mixed solution in which the spent caustic supplied from the spent caustic supplier 110 to the reactor and the oxidizing agent supplied from the oxidizing agent supplier 120 to the reactor are mixed; a gas and liquid separator 140 separating gas and liquid generated by oxidation treatment of the mixed solution in the reactor 130; and a discharger 150 discharging the spent caustic in which the oxidation treatment is completed.

Figure 5:
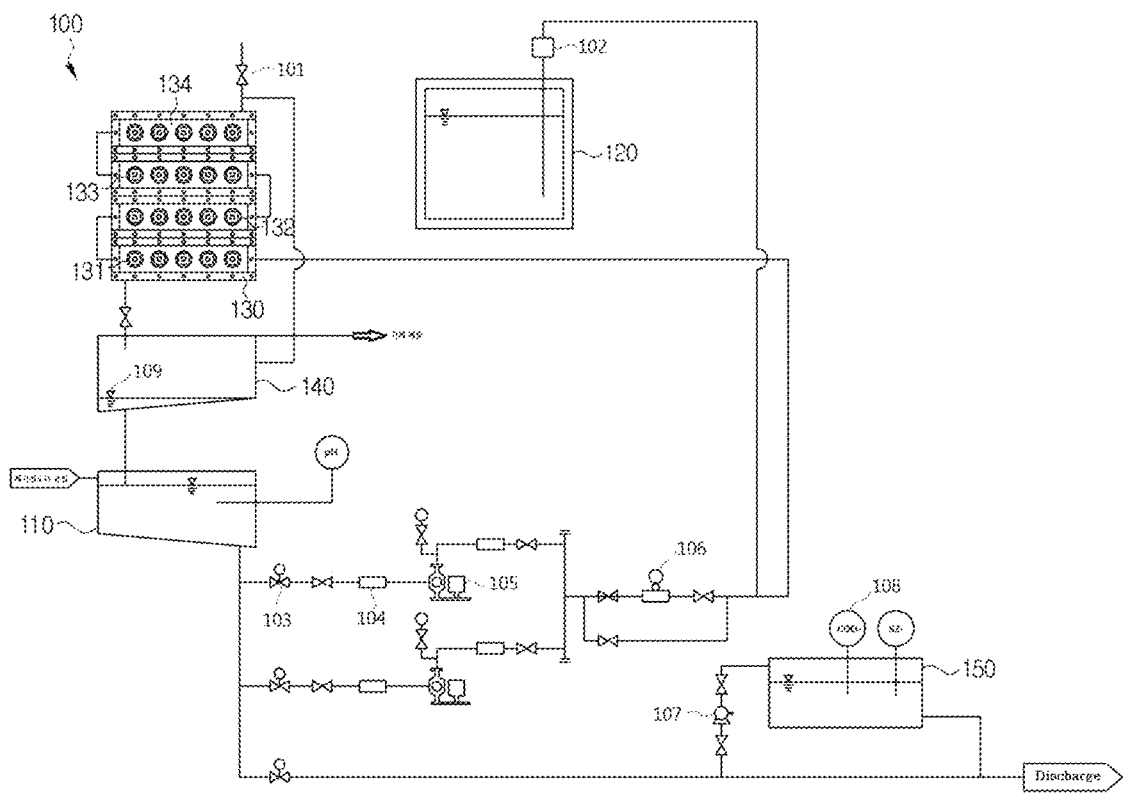
FIG. 5 shows a treatment facility of spent caustic.

The facility of the present invention may be equipped as shown in FIG. 5, and the facility of treating the spent caustic is specifically described with reference to FIG. 5.

The facility of treating the spent caustic 100 may include the spent caustic supplier 110, the oxidizing agent supplier 120, the reactor 130, the gas and liquid separator 140, and the discharger 150, and may further include a pipe connecting the components constituting the facility, a valve for regulating fluid flow, a pump, a flow meter, and a controller.

In the facility of treating the spent caustic 100, the spent caustic is supplied from the spent caustic supplier 110 to the reactor 130 and the oxidizing agent is supplied from the oxidizing agent supplier 120 to the reactor 130, and the mixed solution in which the spent caustic and the oxidizing agent are mixed is injected into a first composite structure 131. The mixed solution injected into the reactor 130 is started to be oxidized while passing through the first composite structure 131. In the mixed solution in which the oxidation treatment is completed while passing through second, third, and fourth composite structures 132, 133 and 134, the gas generated from the gas and liquid separator 140 is separated and discharged, and the liquid which is the oxidized spent caustic is collected again in the spent caustic supplier 110. The liquid collected in the spent caustic supplier 110 may be injected into the reactor again, and be subjected to the treatment process of the spent caustic repeatedly or the liquid may be sent to the discharger 150 and discharged.

According to an exemplary embodiment of the present invention, when pH of the spent caustic supplier 110 is 10 to 14 in the treatment process of the spent caustic, the treated spent caustic collected in the spent caustic supplier 110 may be sent to the discharger and discharged.

The method of treating the spent caustic of the present invention is simple and efficient because the spent caustic is mixed with the oxidizing agent and injected into the reactor, and the subsequent step is continuously performed, and control of other conditions or additional manipulation is not required in the middle of the treatment. In addition, it is possible to treat the spent caustic at room temperature and atmospheric pressure, and thus, there is no energy consumption according to high temperature and high pressure conditions and it is safe.

Since the cost of producing the reactor is low and the low-pressure pump is used in the facility necessary for performing the method of treating the spent caustic of the present invention, the facility may be provided at a low cost. Further, since the reaction process is performed at room temperature and atmospheric pressure in the operation of the facility of treating the spent caustic, it is possible to operate the facility more economically than conventional facilities of treating the spent caustic. The investment cost of the treatment facility may be reduced up to about $1/10$ to $1/20$ as compared to conventional wet oxidation processes. The operating cost of the treatment facility may be reduced up to $1/2$ to $1/3$ per ton as compared to the conventional wet oxidation processes, and thus, it is possible to equip the facility of treating the spent caustic with economical efficiency. In addition thereto, it is possible to solve problems such as a large amount of sludge formation which is a problem of a method of removing precipitation of sulfide ions by metal coagulant, danger of handling by spontaneous ignition of iron sulfide, low efficiency in treatment of mercaptide ions, etc.

Hereinafter, Examples for practicing the present invention will be described. The following Examples are intended to illustrate the present invention and are not to be construed as limiting the scope of the present invention.

EXAMPLE 1

Example 1-1. Preparation of Catalyst Structure Including Titanium Dioxide Photocatalyst 60 to 100 g of anatase type titanium dioxide ($TiO_2$) having a particle size of 20 to 100 nm, 30 to 60 g of liquid PVA (polyvinyl acetate) binder (10 wt %), and 1 to 3 g of methyl cellulose (MC) were placed in a container and stirred at room temperature for 10 to 30 minutes at a speed of 50 to 150 rpm using an automatic stirrer to produce a titanium dioxide sol. The most preferred ratio of a molar mixing ratio of the titanium dioxide nanoparticles, the liquid PVA binder, and the methyl cellulose in the production of the titanium dioxide sol was (20 to 40): (1 to 4): 1. After the titanium dioxide sol was produced, 200 to 250 g of bottom-ash was injected, and the titanium dioxide photocatalyst was stirred and mixed for 30 minutes with an ultrasonic stirrer so as to be uniformly supported on a surface of the bottom-ash particles. Then, the resulting mixture in a sol state was injected into a square plate frame of which a thickness is decreased from the outside to the center (see FIG. 3) and sufficiently dried at 40 to 45° C. for 5 to 10 hours. After dried, the obtained product was washed with water to prepare a square shaped titanium dioxide photocatalyst of which a thickness is decreased from the outside to the center which has a form for treating the spent caustic (FIG. 2). A carrier (see FIG. 3) for uniform lamination, fixation, and support of the completed titanium dioxide photocatalyst was provided to complete a catalyst structure.

Example 1-2. Production of Composite Structure and Reactor

A reactor frame having three to four stages of square shaped containers formed of stainless steel SUS316L suitable for stacking the catalyst structures was prepared. The catalyst structures were stacked inside each stage of the reactor frame, and ultraviolet (UV) lamps were inserted thereinto to produce a reactor 130 in which the composite structures 131 to 134 were formed and stacked at each stage. After the composite structure was formed, a separate plate was prepared to insert and fix the UV lamp on the body and a side surface of the reactor frame, and the plate was connected to the reactor frame using a Teflon gasket and bolt, which was possible to prevent leakage and discharge between the UV lamp and space inside the reactor by fastening the bolt and by using the gasket. A differential pressure gauge was installed to continuously check a condition of the reactor.

Example 1-3. Preparation of Spent Caustic Supplier

The spent caustic supplier 110 was prepared as a container made of a post-heat treated carbon steel material. The spent caustic supply container was installed with a level gauge and a level transmitter to check the liquid level, and a double mechanical seal or a magnet type (non-seal) as a pump type connected to the container was used to prevent odor occurrence.

Example 1-4. Preparation of Oxidizing Agent Supplier

The oxidizing agent supplier 120 was prepared as a container made of SUS316L. The oxidizing agent supplier container was installed with a level gauge and a level transmitter to check the liquid level, and a positive displacement pump for metering was used as a pump type connected thereto.

Example 1-5. Preparation of Gas and Liquid Separator

The gas and liquid separator 140 was prepared as a container made of SUS316L. The gas and liquid separator container was installed with a level gauge and a level transmitter to check the liquid level, and a double mechanical seal or a magnet type (non-seal) as a pump type connected to the container was used to prevent odor occurrence. In order to prevent cavitation of the pump, it was appropriate for the container to have a volume allowing the retention time of an internal fluid to be 20 to 30 seconds, and the liquid level that could maintain the NPSHR or higher of the pump was maintained. The part in which the gas was discharged was connected to an adsorption facility or an incineration facility to treat the odor-causing gas occurring during the reaction.

Example 1-6. Preparation of Discharger

The discharger 150 was prepared as a container made of SUS316L. In the discharger container, the spent caustic in which the reaction was completed was collected, and a level gauge and a level transmitter were installed therein to check the liquid level. The discharger container was connected to a valve for discharging the spent caustic in which the reaction was completed and a pipe leading to the outside.

Example 1-7. Completion of Facility of Treating Spent Caustic

After the spent caustic supplier, the oxidizing agent supplier, the reactor, the gas and liquid separator, and the discharger were prepared, and respective parts were connected through pipes. In the disposition of the treatment facility, the gas/liquid separator was positioned above the spent caustic supplier. In addition, the reactor was positioned above the spent caustic supplier and the gas/liquid separator so that when the spent caustic was injected into the reactor, the spent caustic was reacted while passing through the lowest composite structure and the composite structure at the upper end, and then the oxidized spent caustic was introduced into the gas/liquid separator under the reactor through the valve. This disposition could prevent an increase of pressure by allowing the spent caustic, i.e., the gas and liquid that were generated in the oxidation treatment process of the spent caustic to flow in a cocurrent flow. A control panel was installed to control the operation of the entire facility of treating the spent caustic. A pump, a valve and a flow meter were installed in the middle of the pipe connecting each part as necessary. The pipe was made of SUS316L, and the joints of the pipe were treated with post-heat treated carbon steel as necessary. The shape of the valve connecting each part, the pump and the flow meter, etc., may be freely changed according to the disposition of each part of the facility of treating the spent caustic, and FIG. 5 shows an example of the facility.

EXAMPLE 2

Example 2-1. Oxidation Treatment of Spent Caustic

The spent caustic was treated in the facility of treating the spent caustic according to Example 1. 500 L of spent caustic produced from the LPG Merox process (LMX) was injected through the spent caustic supplier, and hydrogen peroxide was placed in the oxidizing agent supplier. A UV lamp was operated through the control panel, and 20 to 40 L of hydrogen peroxide was supplied to the reactor from the oxidizing agent supplier while injecting the spent caustic from the spent caustic supplier to the reactor. The spent caustic and hydrogen peroxide which was an oxidizing agent were injected into the reactor and mixed, and the mixed solution was oxidized through the reactor, and thus, a solution including the oxidized spent caustic and gas were generated. The generated gas and liquid were moved to the gas and liquid separator, and the gas was separated and discharged by the gas and liquid separator. After the gas was separated and discharged, the remaining liquid was again collected to the spent caustic supplier. This process was repeated 10 times in total, and the spent caustic in which the oxidation treatment was completed was discharged and collected through the discharger. In the method of treating the spent caustic, all processes were performed at 1 to 2 kgf/cm$^2$ pressure and 40 to 70° C. temperature.

Example 2-2. Analysis of Oxidized Spent Caustic

Figure 6:
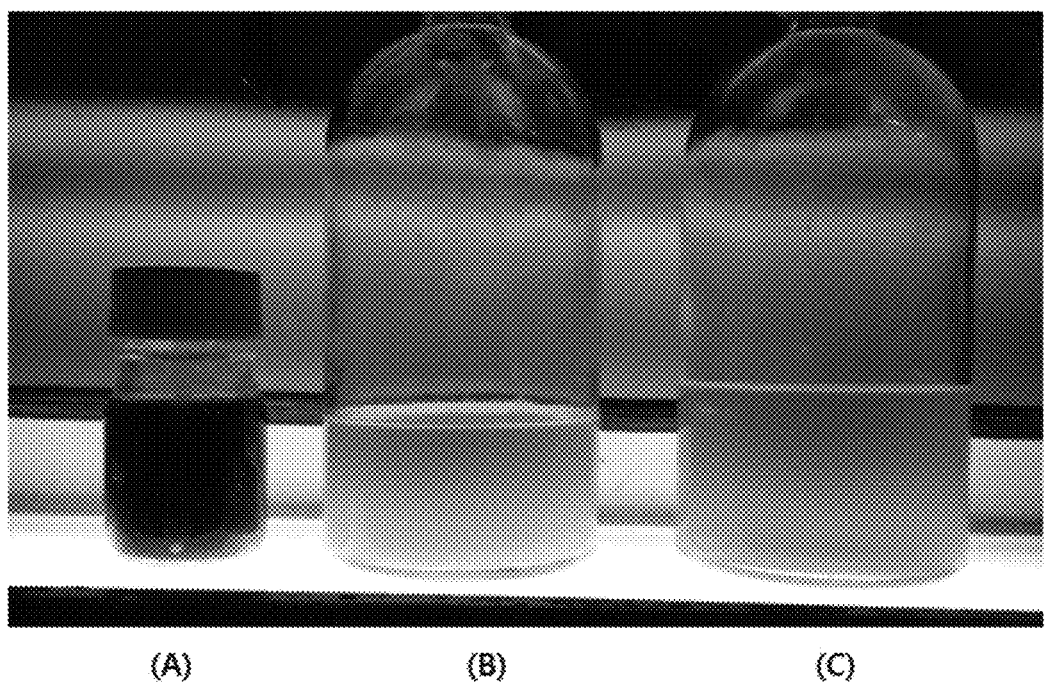
FIG. 6 shows comparison of the spent caustic before and after treatment, specifically, part (A) shows the spent caustic before treatment, part (B) shows the spent caustic after the treatment for 1 hour, and part (C) shows the spent caustic after the treatment for 2 hours.

Table 1 shows analysis results of the liquid, i.e., the oxidized spent caustic (FIG. 6) collected in the spent caustic supplier after the process was repeated 10 times in total and 2 hours passed, confirming that $COD_{cr}$ as chemical oxygen demand of the spent caustic, sulfides and mercaptides were reduced and sulfur oxides were increased.

TABLE 1

|  | LMX Spent Caustic | Oxidized Spent Caustic |
|---|---|---|
| $COD_{cr}$ (ppm) | 42000 | 8610 |
| $S^{2-}$ (Sulfide) | 18400 | 3400 |
| $SO_4^{2-}$ (Sulfate) | 300 | 12300 |

Figure 7:
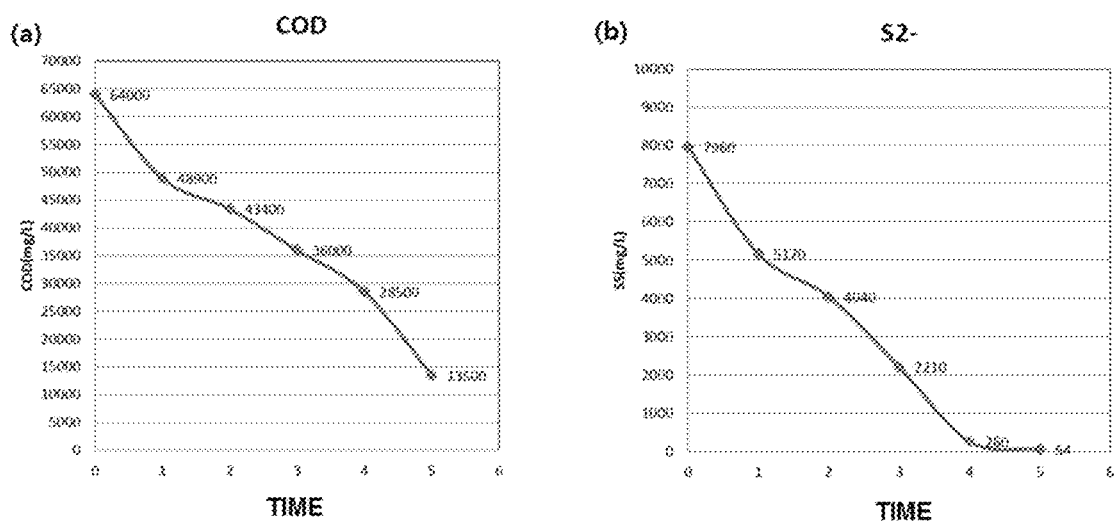
FIG. 7 shows reduction amounts over time of (a) COD and (b) sulfide ion ($S^{2-}$) included in the spent caustic in performing a method of treating the spent caustic according to the present invention.

Further, the spent caustic oxidation treatment was performed to observe results of the process of treating the spent caustic over time (FIG. 7). As a result, it was confirmed that COD was continuously decreased over time, and sulfide ($S^{2-}$) was mostly eliminated.

The method of treating spent caustic according to the present invention may be performed under mild conditions to reduce energy consumption, and thus the process may be performed at a low cost, and may be simple and safe to provide a facility at low cost, and sulfur compounds included in the spent caustic and chemical oxygen demand may be efficiently reduced.

What is claimed is:
1. A method of treating spent caustic comprising:
supplying an oxidizing agent from an oxidizing agent supplier to a reactor while supplying spent caustic to the reactor from a spent caustic supplier spaced apart from and positioned below a gas and liquid separator, wherein said spent caustic flows from, is generated by, and/or originates from a hydrocarbon stream desulfurization step of a petroleum-refining or petrochemical process and comprises at least one of sulfide and mercaptide, and wherein the oxidizing agent and the spent caustic are supplied to the reactor along different connection pipes from each other;

mixing the spent caustic supplied from the spent caustic supplier and the oxidizing agent supplied from the oxidizing agent supplier in a section of pipe upstream of the reactor, thereby preparing a mixed solution consisting of the spent caustic and the oxidizing agent in the section;

oxidizing the spent caustic by passing the mixed solution through catalyst structures in the reactor while irradiating ultraviolet rays, thereby generating gas and liquid in the reactor;

moving the gas and the liquid generated in the reactor to the gas and liquid separator spaced apart from and positioned below the reactor;

separating the gas and the liquid generated in the reactor with the gas and liquid separator, wherein the liquid separated by the separation treatment is returned to the spent caustic supplier; and discharging the spent caustic in which treatment reaction is completed by the oxidation treatment by a discharger, wherein the spent caustic is sent to the discharger from the spent caustic supplier once a pH of the spent caustic in the spent caustic supplier is in a range of 10-14.

2. The method of claim 1, wherein the catalyst structure includes a titanium oxide photocatalyst produced by wet impregnation of titanium dioxide and bottom-ash.

3. The method of claim 2, wherein the oxidation treatment is performed in the reactor in which a composite structure including the catalyst structures stacked therein and an ultraviolet (UV) lamp are disposed to be penetrated in parallel with a stacked direction of the catalyst structures in the composite structure.

4. The method of claim 3, wherein the oxidation treatment is performed in the stacked direction of the catalyst structures, and the gas and the liquid generated by the oxidation treatment are oxidized through the reactor in a co-current flow and then separated by the separation treatment.

5. The method of claim 4, wherein all steps of the method of treating spent caustic are performed at a temperature of 40° C. to 70° C. and a pressure of 1 kgf/cm$^2$ to 2kgf/cm$^2$.

6. The method of claim 4, wherein the oxidation treatment and the separation treatment are further performed with the liquid separated by the separation treatment.

7. The method of claim 6, wherein the oxidation treatment and the separation treatment are further performed until a chemical oxygen demand (CODcr) value included in the liquid separated by the separation treatment is 10,000 mg/L or less.

8. The method of claim 1, wherein the oxidizing agent is hydrogen peroxide, ozone or a potassium persulfate aqueous solution.

9. A facility of treating spent caustic which flows from, is generated by, and/or originates from a hydrocarbon stream desulfurization step of a petroleum-refining or petrochemical process and comprises at least one of sulfide and mercaptide, comprising:

a spent caustic supplier supplying the spent caustic to a reactor, and spaced apart from and positioned below a gas and liquid separator;

an oxidizing agent supplier supplying an oxidizing agent to the reactor;

the reactor oxidizing a mixed solution in which the spent caustic supplied from the spent caustic supplier and the oxidizing agent supplied from the oxidizing agent supplier are mixed in a section of pipe upstream of the reactor, and including catalyst structures, wherein the mixed solution consists of the spent caustic and the oxidizing agent;

the gas and liquid separator separating gas and liquid generated by oxidation treatment of the mixed solution in the reactor, the gas and liquid separator spaced apart from and positioned below the reactor; and a discharger discharging the spent caustic in which treatment reaction is completed by the oxidation treatment, wherein the facility is configured such that the oxidizing agent and the spent caustic are supplied to the reactor along different connection pipes from each other, and wherein the spent caustic supplier is configured to receive the liquid from the gas and liquid separator, and is configured such that spent caustic is sent to the discharger when a pH of the spent caustic in the spent caustic supplier is in a range of 10-14.

10. The facility of claim 9, wherein the reactor includes a composite structure including the catalyst structures stacked therein, and wherein each of the catalyst structures comprises a titanium oxide photocatalyst.

11. The method of claim 1, wherein the oxidation treatment is performed in the reactor in which a composite structure including the catalyst structures stacked therein, each of the catalyst structures is porous and comprises a titanium oxide photocatalyst produced by wet impregnation of titanium dioxide and bottom-ash, and the titanium oxide photocatalyst has a shape of a polygonal plate having grooves formed on one side or both sides.

12. The facility of claim 9, wherein the reactor includes a composite structure including the catalyst structures stacked therein, each of the catalyst structures is porous and comprises a titanium oxide photocatalyst produced by wet impregnation of titanium dioxide and bottom-ash, and the titanium oxide photocatalyst has a shape of a polygonal plate having grooves formed on one side or both sides.

* * * * *